(12) United States Patent
Omelchenko et al.

(10) Patent No.: US 6,657,650 B1
(45) Date of Patent: Dec. 2, 2003

(54) METHOD OF LASER PRINTHEAD REGISTRATION CONTROL IN AN ELECTROPHOTOGRAPHIC MACHINE

(75) Inventors: Mark A. Omelchenko, Lexington, KY (US); Gregory L. Ream, Lexington, KY (US); David A. Schneider, Lexington, KY (US)

(73) Assignee: Lexmark International, Inc., Lexington, KY (US)

(*) Notice: Subject to any disclaimer, the term of this patent is extended or adjusted under 35 U.S.C. 154(b) by 0 days.

(21) Appl. No.: 10/201,523

(22) Filed: Jul. 23, 2002

(51) Int. Cl.[7] ............ G02B 26/10; B41J 2/435
(52) U.S. Cl. .................. 347/234; 347/235
(58) Field of Search .................. 347/116, 234, 347/235, 248, 250, 129, 133; 359/196, 204

(56) References Cited

U.S. PATENT DOCUMENTS

| | | |
|---|---|---|
| 4,270,131 A | 5/1981 | Tompkins et al. |
| 4,860,035 A | 8/1989 | Klein Meuleman et al. |
| 4,885,596 A | 12/1989 | Egawa et al. |
| 5,059,987 A | 10/1991 | Takeyama et al. |
| 5,155,616 A | 10/1992 | Yamaguchi et al. |
| 5,168,292 A | 12/1992 | Kadowaki et al. |
| 5,452,073 A | 9/1995 | Kataoka |
| 5,576,753 A | 11/1996 | Kataoka et al. |
| 5,638,109 A | 6/1997 | Agano |
| 5,828,925 A | 10/1998 | Yoshizawa |
| 5,864,739 A | 1/1999 | Kaneko et al. |
| 5,887,125 A | 3/1999 | Takano et al. |
| 6,002,413 A | 12/1999 | Nishizawa et al. |
| 6,008,826 A | 12/1999 | Foote et al. |
| 6,055,073 A | 4/2000 | Nomura et al. |
| 6,118,463 A | 9/2000 | Houki et al. |
| 2001/0028387 A1 * | 10/2001 | Maeda ............ 347/234 |

FOREIGN PATENT DOCUMENTS

JP 63-316016 A * 12/1988

* cited by examiner

*Primary Examiner*—Joan Pendegrass
(74) *Attorney, Agent, or Firm*—Taylor & Aust, P.C.

(57) ABSTRACT

A method of printing with an electrophotographic machine includes providing a first optical sensor for sensing a start-of-scan position of a laser beam produced by a scanning laser printhead and transmitting a first position signal indicative thereof A second optical sensor senses an end-of-scan position of the laser beam produced by the scanning laser printhead and transmits a second position signal indicative thereof A temperature of the scanning laser printhead is measured with a temperature sensing device. A plurality of positions of each of the first optical sensor and the second optical sensor are empirically determined at each of a plurality of values of the temperature of the scanning laser beam printhead. The modulation or position of the laser beam produced by the scanning laser printhead is adjusted based upon the first position signal, the second position signal, the measured temperature of the laser printhead, and the empirically determined positions of the first optical sensor and the second optical sensor and the second optical sensor. A single optical sensor and a single thermal sensor constitute the minimum hardware embodiment to perform print line position correction based upon stored empirical relationship.

27 Claims, 12 Drawing Sheets

METHOD OF LASER PRINTHEAD REGISTRATION CONTROL IN AN ELECTROPHOTOGRAPHIC MACHINE

BACKGROUND OF THE INVENTION

1. Field of the Invention

The present invention relates to electrophotographic machines, and, more particularly, to a method of controlling laser printhead registration in an electrophotographic machine.

2. Description of the Related Art.

Scanning lasers have significant advantages over light emitting diode (LED) printheads in both monochrome and multi-color printers. These advantages include uniformity of radiant energy across a scan line, uniformity of spot size, a resolution determined by laser diode modulation rather than physical spacings, comparatively low power consumption and resulting low heat generation, optics spaced from the source of toner contamination, and comparatively lower cost.

Although scanning lasers have the above-described advantages, single-pass color electrophotographic printers using scanning laser printheads present registration difficulties not found in printer designs using LED printheads. Initial laser spot position in scan and process directions, line length, skew and bow are all expected variations which affect registration of color planes. Temperature changes of the printhead and its mounting are the major source of change in registration.

A color-to-color image registration problem arises in single-pass laser printers that have more than one laser imaging source. The registration problem is largely attributable to thermally induced changes in scanning laser beam profile and position, laser start-of-scan sensor position, and laser end-of-scan sensor position. Thermally induced changes in the shape and mounting of optical elements, thermally induced changes in the size of the mounting surface, and a relatively long optical path length can contribute to produce line length, skew, and bow scanning spot position changes at the imaging plane of one or more picture elements (pels). The width of a pel is approximately 42.3 $\mu$m at 600 dots per inch (dpi). Differences in heating among multiple laser imaging sources then contributes to misregistration of color planes in a composite image. Print quality is generally judged as unacceptable when color plane misregistration exceeds 100 $\mu$m.

What is needed in the art is a method of registering a printhead in both the scan and cross-scan directions over a range of printhead operating temperatures.

SUMMARY OF THE INVENTION

The present invention provides a method of using temperature sensing in conjunction with optical sensors and electronic feedback to control registration of a scanning laser printhead suited for single-pass EP printing.

The invention comprises, in one form thereof, a method of printing with an electrophotographic machine. A first optical sensor senses a start-of-scan position of a laser beam produced by a scanning laser printhead and transmits a first position signal indicative thereof. A second optical sensor senses an end-of-scan position of the laser beam produced by the scanning laser printhead and transmits a second position signal indicative thereof. A temperature of the scanning laser printhead is measured with a temperature-sensing device. A plurality of positions of each of the first optical sensor and the second optical sensor are empirically determined at each of a plurality of values of the temperature of the scanning laser beam printhead. The modulation or position of the laser beam produced by the scanning laser printhead is adjusted based upon the first position signal, the second position signal, the measured temperature of the laser printhead, and the empirically determined positions of the first optical sensor and the second optical sensor.

The invention comprises, in another form thereof, a method of printing with an electrophotographic machine. A desired scan line length is determined. A plurality of temperatures associated with the electrophotographic machine are measured at respective points in time. A plurality of calibration scan line lengths are empirically determined at a plurality of values of the temperatures associated with the electrophotographic machine. The calibration scan line lengths are used to calculate a scan line length thermal expansion as a function of the temperature associated with the electrophotographic machine. A number of slices in a scan line to be printed is adjusted. The adjusting is dependent upon a current one of the measured temperatures and the scan line length thermal expansion such that a length of the scan line to be printed is substantially equal to the desired scan line length.

An advantage of the present invention is that thermally induced changes in printhead registration can be compensated for.

Another advantage is that thermally induced shifts in the positions of a start-of-scan sensor and an end-of-scan sensor can be compensated for.

Yet another advantage is that the resulting scanning laser printhead has registration performance similar to a modular LED printhead.

A further advantage is that the method of the present invention is applicable to laser printheads in which a single scanning polygon is shared among multiple laser sources to produce multiple scanning laser beams.

BRIEF DESCRIPTION OF THE DRAWINGS

The above-mentioned and other features and advantages of this invention, and the manner of attaining them, will become more apparent and the invention will be better understood by reference to the following description of an embodiment of the invention taken in conjunction with the accompanying drawings, wherein:

FIG. 6 is a plot of the position of the start-of-scan sensor of FIG. 4 at the two different operating temperatures of FIG. 5;

Corresponding reference characters indicate corresponding parts throughout the several views. The exemplification set out herein illustrates one preferred embodiment of the invention, in one form, and such exemplification is not to be construed as limiting the scope of the invention in any manner.

DETAILED DESCRIPTION OF THE INVENTION

The present invention provides temperature sensing at each imaging source to provide augmentation to start-of-scan and end-of-scan optical sensors, as well as to provide correction of thermally induced errors in the sensors' output signals, which are input signals to a controller. The controller produces electronic corrections to correct spot position for bow, skew, line-length, and start-of-scan timing based upon these sensor inputs. The electronic corrections may include controlling a time at which a scan of a laser printhead begins, or controlling a data rate of the scanning laser printhead. With this electronic control, the resulting modular imaging source possesses spot location accuracy that is suitable for color image registration in a single-pass EP printer.

Figure 1:
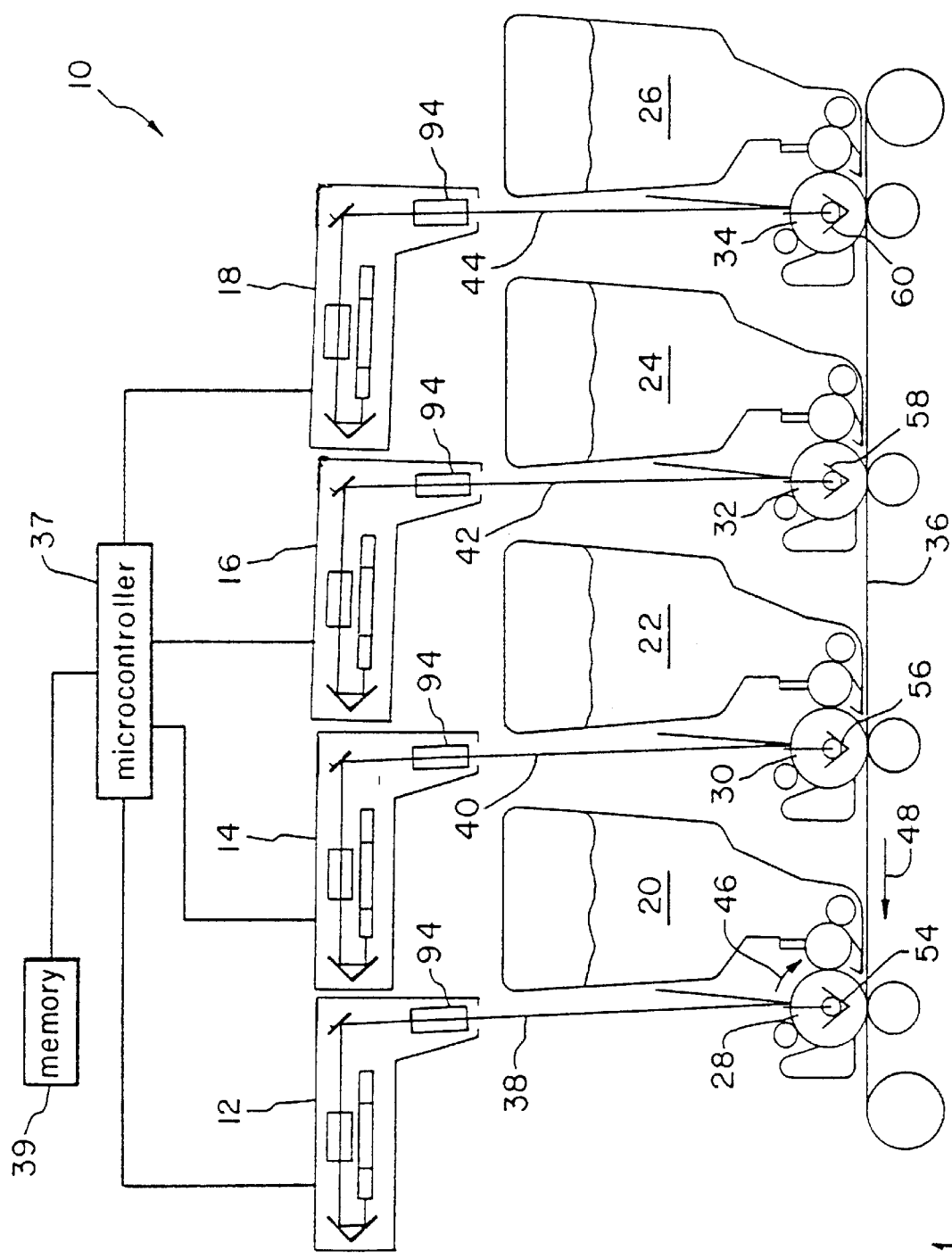
FIG. 1 is a partial, schematic, side view of one embodiment of a laser printer in which the method of the present invention may be used.

Referring now to the drawings, and, more particularly, to FIG. 1, there is shown one embodiment of a multicolor laser printer 10 including laser printheads 12, 14, 16, 18, toner cartridges 20, 22, 24, 26, photoconductive drums 28, 30, 32, 34, an intermediate transfer member belt 36, microcontroller 37 and memory device 39.

Each of laser printheads 12, 14, 16 and 18 can control printing in a respective color, such as cyan, magenta, yellow or black. Each of laser printheads 12, 14, 16 and 18 scans a respective one of laser beams 38, 40, 42 and 44 in a scan direction, perpendicular to the plane of FIG. 1, across a respective one of photoconductive drums 28, 30, 32 and 34. Photoconductive drums 28, 30, 32, 34 are mounted to a steel frame 52 of printer 10 via a corresponding set of V-shaped notches 54, 56, 58 and 60, respectively. Each of photoconductive drums 28, 30, 32 and 34 is negatively charged to approximately −950 volts and is subsequently discharged to a level of approximately −300 volts in the areas of its peripheral surface that are impinged by a respective one of laser beams 38, 40, 42 and 44. During each scan of a laser beam across a photoconductive drum, each of photoconductive drums 28, 30, 32 and 34 is continuously rotated, clockwise in the embodiment shown, in a process or "cross-scan" direction indicated by direction arrow 46. The scanning of laser beams 38, 40, 42 and 44 across the peripheral surfaces of the photoconductive drums is cyclically repeated, thereby discharging the areas of the peripheral surfaces on which the laser beams impinge.

The toner in each of toner cartridges 20, 22, 24 and 26 is negatively charged and is doctored onto a developer roll with shaft potential of approximately −600 volts. Thus, when the toner from cartridges 20, 22, 24 and 26 is brought into contact with a respective one of photoconductive drums 28, 30, 32 and 34, the toner is electrostatically attracted to and adheres to the portions of the peripheral surfaces of the drums that have been discharged to −300 volts by the laser beams. As belt 36 rotates in the direction indicated by arrow 48, the toner from each of drums 28, 30, 32 and 34 is transferred to the outside surface of belt 36. As a print medium, such as paper (not shown), travels along a paper path, the toner is transferred from belt 36 to the surface of the print medium in a nip between opposing rollers.

Figure 3:
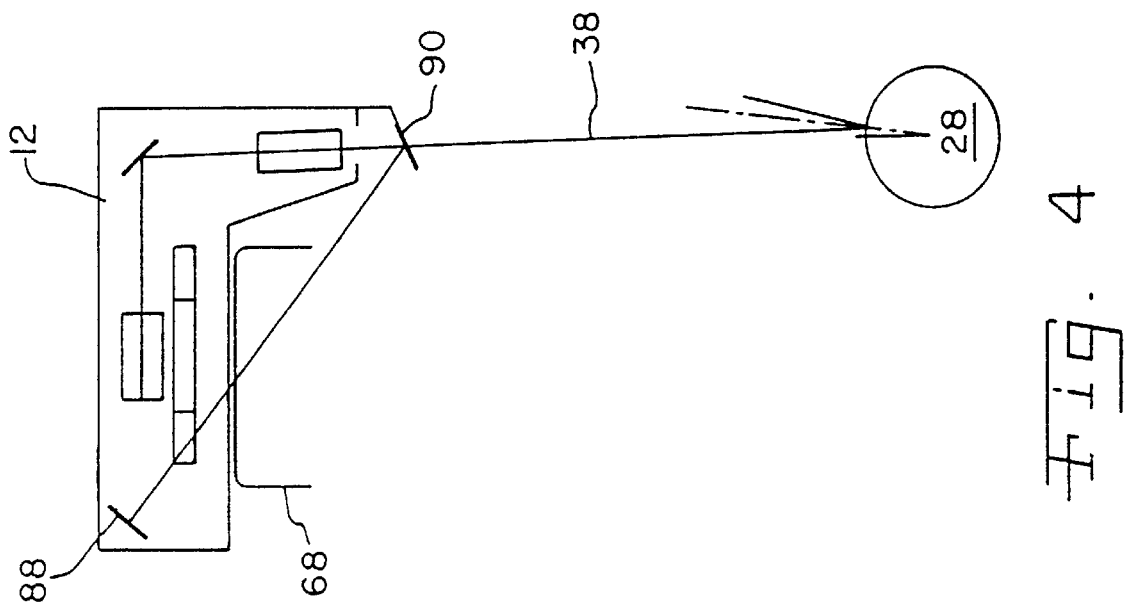
FIG. 3 is a schematic, side view of the laser printhead of FIG. 2 with an end-of-scan sensor and the corresponding photoconductive drum.
Figure 4:
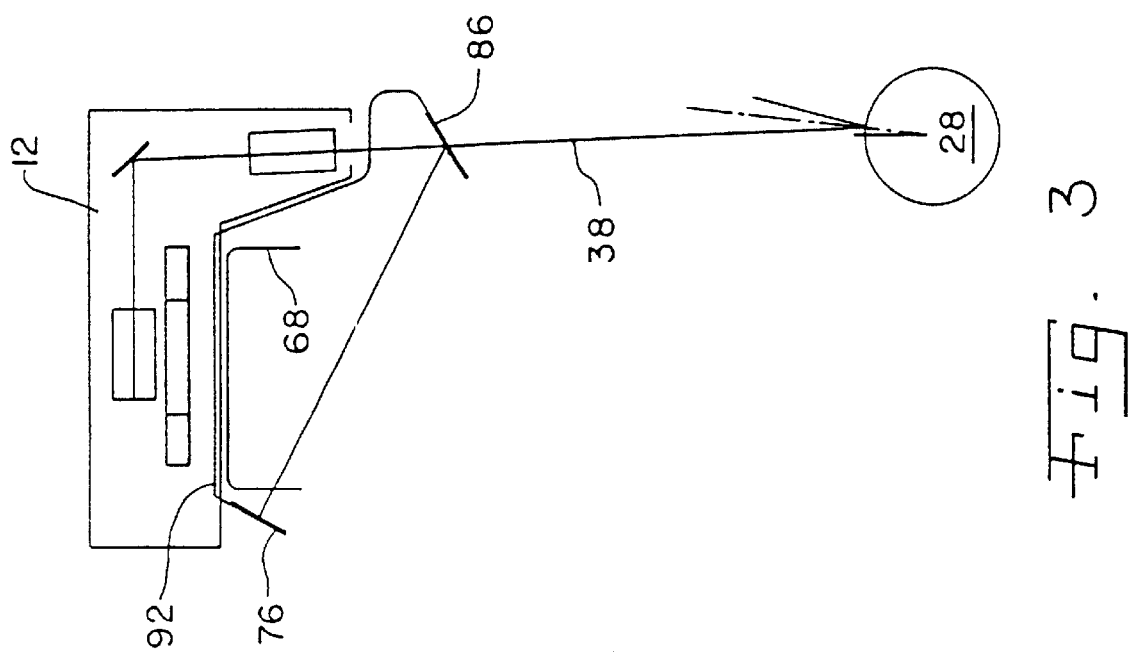
FIG. 4 is a schematic, side view of the laser printhead of FIG. 2 with a start-of-scan sensor and the corresponding photoconductive drum.

Printheads 12, 14, 16, 18 are structurally substantially identical. Accordingly, to simplify the discussion and for ease of understanding the invention, only the structure of printhead 12 will be described in detail below in relation to FIGS. 2–4. However, it is to be understood that the discussion that follows with respect to printhead 12 also applies to each of printheads 14, 16 and 18.

Figure 2:
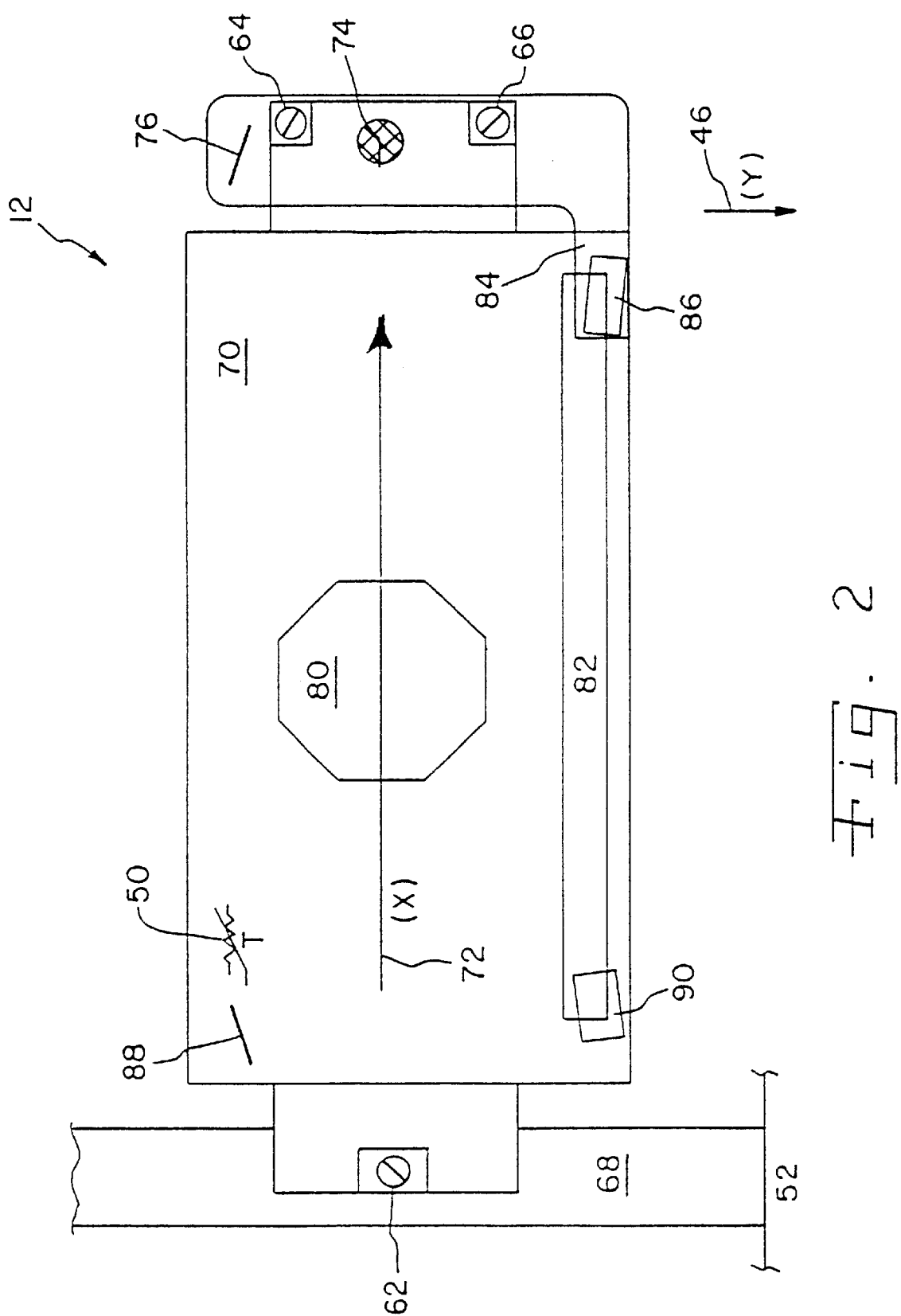
FIG. 2 is a top view of one of the laser printheads of FIG. 1.

Referring to FIGS. 1 and 2, single-pass printer 10 includes a respective thermal sensor 50 (FIG. 2), and the feedback control enabled thereby, in laser printhead 12. Steel frame 52 of electrophotographic printer 10 accurately locates individual printhead 12 to color photoconductive drum 28 in a print cartridge. Photoconductive drum 28 is precision located in V-notch 54, which is machined into heavy gauge steel rails that are riveted, welded, or otherwise permanently affixed to steel frame 52. As shown in FIG. 2, printhead 12 is mounted, such as by screws 62, 64, 66, to a steel channel 68 that is similarly riveted, welded or otherwise permanently affixed to the steel frame 52 in precision registration to the steel V-notch 54 which supports cartridge photoconductive drum 28.

Printhead 12 includes a body 70 which is designed and mounted to allow predictable thermal expansion of body 70 in scan direction 72 relative to an anchor point 74. Anchor point 74 is located near end-of-scan position sensor 76. Symmetry in the mounting and printhead design minimizes thermally induced skew in cross-scan direction 46. Printhead 12 includes a polygon mirror 80, indicated only schematically in FIG. 2, off of which laser beam 38 is reflected. Lens 82 is biased against a stop 84 in the end-of-scan side of printhead body 70, thereby also allowing predictable thermal expansion.

End-of-scan sensor 76 (FIG. 3) is an optical position-sensitive detector, and is positioned to detect scanning laser beam 38 at the end-of-scan. End-of-scan sensor 76 has signal outputs related to both scan direction 72 (x-axis) and cross-scan direction 46 (y-axis). End-of-scan sensor 76 is rigidly and mechanically connected to and supported by steel frame 52 for accurate and precise positioning. End-of-scan sensor 76 is positioned coincident with printhead anchor point 74. Further, end-of-scan sensor 76 is positioned to receive scanning laser beam 38 after printhead lens 82 and near the image plane within a focal point zone following reflection from a mirror 86 located on the rigid mechanical support. Alternatively, end-of-scan sensor 76 can be located on steel frame 52 in proximity to photoconductive drum 28 at the end-of-scan. End-of-scan sensor 76 is mounted for accurate positioning relative to a fixed datum in the form of anchor point 74.

With the three-point mounting of FIG. 2, the end-of-scan side of printhead 12 is anchored, and thermal expansion is channeled for growth in scan direction 72 toward the startof-scan side of printhead 12. Printhead 12 is designed for symmetrical growth with thermal expansion in cross-scan direction 46 to avoid thermally induced skew.

Start-of-scan sensor 88 (FIG. 4) is a position sensitive detector, and is mounted within printhead body 70 to detect scanning laser beam 38 at the start-of-scan. Start-of-scan sensor 88 can have both scan direction 72 and cross-scan direction 46 signal outputs. Alternatively, start-of-scan sensor 88 can have only a scan direction 72 signal output. Start-of-scan sensor 88 is mounted within printhead body 70 in order to provide an integral start-of-scan sensor for testing printhead 12 as a module at the time of manufacture. Further, start-of-scan sensor 88 is positioned to receive scanning laser beam 38 after printhead lens 82 and near the image plane within the focal point zone following reflection from a start-of-scan mirror 90 located on the printhead support surface.

Figure 5:
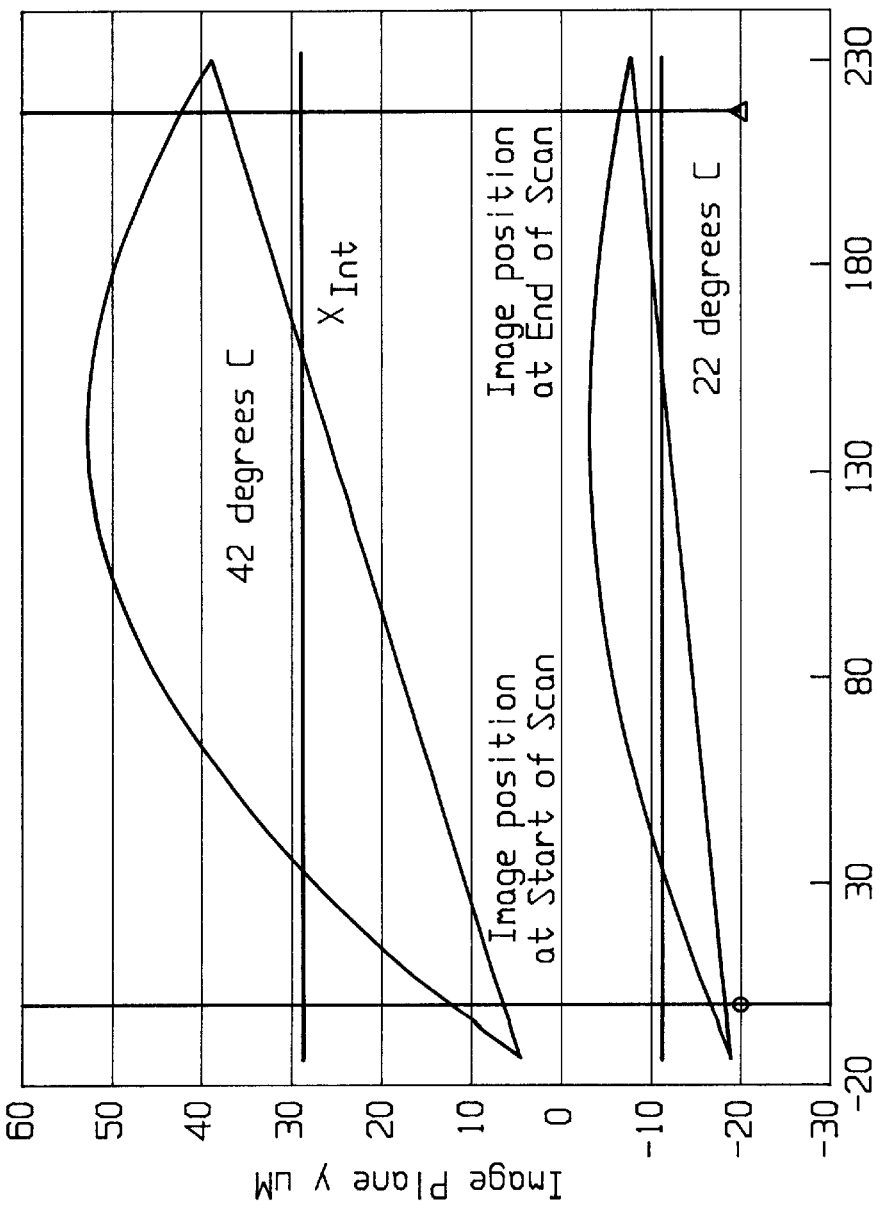
FIG. 5 is a plot of the laser scan position of the printhead of FIG. 2 in the scan direction and the cross-scan direction at two different operating temperatures.

Errors in laser imaging position that result from printhead temperature changes are illustrated in FIG. 5, which is a plot of laser spot position at the image plane relative to a fixed datum, for example, photoconductive drum V-notch 54. The scans shown correspond to a fixed rate of angular rotation of printhead polygon mirror 80 and are plotted at two different operating temperatures. The x-axis, labeled "Image Plane x", indicates laser scan position in scan direction 72. The y-axis, labeled "Image Plane y", indicates laser scan position in cross-scan direction 46.

Five types of scan position errors are illustrated at each of the two temperatures. Data related to the magnitudes of these errors at various temperatures can be empirically determined and stored in memory device 39. Microcontroller 37 can then adjust the modulation or physical position of laser printhead 12 based upon these error characteristics and a present temperature as measured by thermistor 50.

A first of the five types of scan position errors is a DC Offset Position in cross-scan direction 46. FIG. 5 shows a shift from −11 μm at 22° C. to +29 μm 42° C. for the average scan position change with temperature (horizontal scan lines), using a position of 160 mm along the x axis, as the reference for both 22° C. and 42° C. Thus, the shift is 2 μm per degree C.

The second type of scan position error is skew in cross-scan direction 46. A skew rotation point is shown at 160 mm at both 22° C. and 42° C. The skew has a magnitude of 10 μm over the image width at 22° C., and 30 μm over the image width at 42° C. Thus, the change in slope over the image width of 215.9 mm is 1 μm per degree C.

The third type of scan position error is the bow in cross-scan direction 46. There is a change in the magnitude of the bow from 10 μm at 22° C. to 30 μm at 42° C. Thus, the change in magnitude is approximately 1.0 μm per degree C. The illustrated shape is a ½ cycle sine function, but other shapes of bow may result from a particular printhead design or adjustment.

Figure 7:
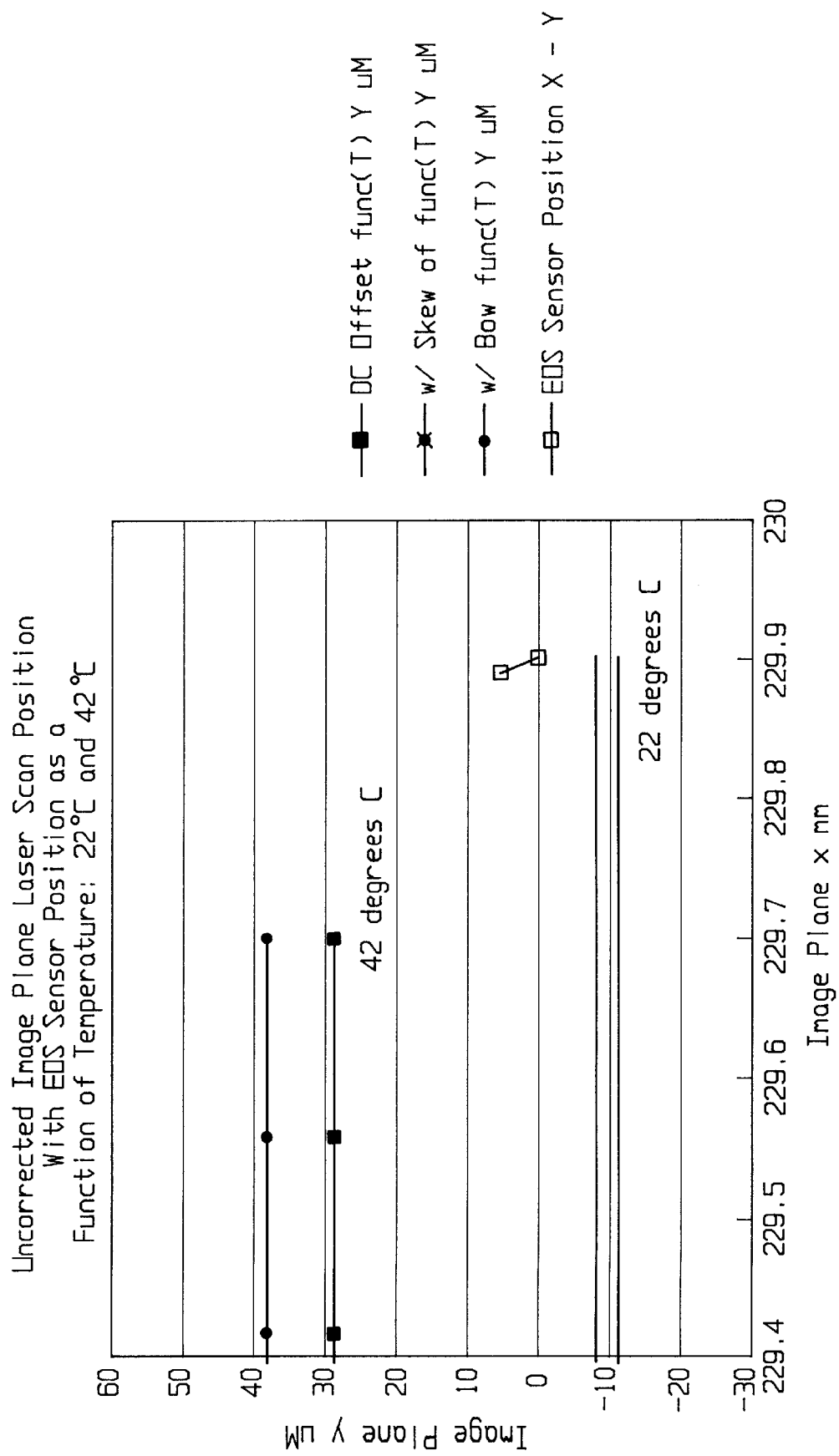
FIG. 7 is a plot of the position of the end-of-scan sensor of FIG. 3 at the two different operating temperatures of FIG. 5.

The fourth type of scan position error is magnification in scan direction 72. FIG. 6 illustrates an expanded scale at start-of-scan, and FIG. 7 illustrates an expanded scale at end-of-scan. FIG. 6 shows the image starting position −14 mm at 22° C. and −14.3 mm at 42° C. FIG. 7 shows the image ending at position 229.9 at 22° C. and 229.7 at 42° C. This indicates that the line length had grown from 243.9 mm to 244 mm. The fifth type of scan position error is a start-of-scan offset in scan direction 72.

End-of-scan sensor 76 and start-of-scan sensor 88 can be used to detect and correct, via electronic feedback, for the majority of changes in x-y laser scan position at the image plane. Because the optical detector positions are also subject to change with temperature, the resulting corrections may be erroneous unless detector position is corrected for temperature. End-of-scan sensor 76 and start-of-scan sensor 88 change position with respect to the datum as a result of thermal expansion of the mounting surfaces, lenses, and mirrors in the sensor optical path.

Thermistor 50, which may also be any type of temperature-measuring transducer, is positioned within the printhead enclosure to sense the temperature of the printhead structure and lenses. For example, sensing thermistor 50 can be located on the start-of-scan sensor printhead circuit board (not shown) to share the printhead circuit card and connector. However, thermistor 50 is intentionally not mounted on the motor driver card heat source in order to avoid measuring a temperature that is artificially high and not representative of a temperature affecting printhead thermal expansion.

Thermal sensor 50 in scanning laser printhead 12 enables correction of position measurements made using end-of-scan sensor 76 and start-of-scan sensor 88. The movements of end-of-scan sensor 76 and start-of-scan sensor 88 produced by thermal expansion is significant compared to allowable misregistration. Temperature sensing provides a tool for estimating detector movement and correcting the corresponding position measurements. The resulting thermally-corrected optical measurements of scanning laser position enable accurate electronic feedback to correct start-of-scan (single x-axis sensor), line length (dual x-axis sensors), cross-scan location (at least one y-axis sensor), and skew (dual y-axis sensors).

Thermal sensor 50 in scanning laser printhead 12 also enables estimation of skew and bow errors which are not measured optically. The characteristics for skew and bow are measured and recorded for the particular printhead design. Skew is modeled and stored as a linear equation in which slope (and optionally rotation point) is a function of temperature. Bow is modeled as a polynomial and stored as a table which scales with temperature, or as an equation that includes a function of temperature. Skew is then compensated for by using a single y-sensor rather than two y-sensors. Bow can also be compensated for by using a single y-sensor, rather than a sensor array.

The present invention provides a model for optical sensor position as a function of measured printhead temperature using the printhead mounted thermistor 50 for thermal feedback. Optical sensor location is characterized and results in a position change with respect to the image plane as illustrated in FIGS. 6 and 7.

Start-of-scan sensor 88 can be mounted to printhead body 70, far from printhead anchor point 74. As a result, the change in sensor position, as compared to the image plane datum, is large. This is shown in FIG. 6 where the (x, y) location of start-of-scan sensor 88 is (−14000, 0) μm at 22° C. and (−14070, 35) μm at 42° C. Thus, without thermal compensation, the optical sensor location error would be −70 μm in the x-direction and 35 μm in the y-direction at 42° C. With thermal compensation, using a stored value of 3.5 μm per degree C. in the x direction and −1.75 μm per degree C. in the y direction, the location of start-of-scan sensor 88 is corrected and minimized as a source of error. The absolute position of the scanning laser in reference to the datum is determined to a higher degree of accuracy so that color registration errors are minimized.

End-of-scan sensor 76 can be mounted on a metal bracket 92 (FIG. 3) near anchor point 74. As a result, the change in sensor position, as compared to the image plane datum, is very small. This is shown in FIG. 7 where the end-of-scan sensor (x, y) location is (229900, 0) μm at 22° C. and (229890, 5) μm at 42° C. Thus, without thermal compensation, the optical sensor location error would be −10 μm in the x-direction and 5 μm in the y-direction at 42° C. This error magnitude is small enough that it can be ignored such that the position of end-of-scan sensor 76 is not thermally corrected. However, a correction equivalent to that used at start-of-scan sensor 88 would, if implemented, use a stored value of 0.5 μm per degree C. in the x direction and −0.25 μm per degree C. in the y-direction.

Start-of-scan x-y sensor 88 and end-of-scan x-y sensor 76 would both be needed to generate and transmit a feedback signal to microcontroller 37 in order to correct for the first, second, fourth and fifth types of scan position errors discussed above. If start-of-scan sensor 88 provides position information in scan direction 72 only, then sensors 76 and 88 can be used to generate and transmit a feedback signal to microcontroller 37 in order to correct for the first, fourth and fifth types of scan position errors discussed above.

A y-direction measurement is needed at both ends of the scan in order to directly measure skew. Thus, if start-of-scan sensor 88 has only scan direction 72 measurement capability, skew cannot be measured directly.

The present invention uses printhead thermistor sensor 50, in combination with a particular printhead design and mounting, to calculate skew based upon a stored model. The y direction laser spot position is treated as a linear function of the x scan position as: $y_{sk}=A(T)[x-x_{int}(T)]$ μm. $A(T)$ is the skew slope as a function of temperature. The function $x_{int}(T)$ sets the x intercept value corresponding to the skew rotation point ($y_{sk}=0$) as a function of temperature. In the example of FIG. 5, with T in ° C., $A(T)=(T \times 1$ μm/degree C.−12 μm)/215.9 mm; and $x_{int}(T)=160$ mm=constant.

The end-of-scan y-direction value attributable to skew needs to be accounted for in DC offset correction, which is based upon a single end-of-scan y optical measurement at end-of-scan sensor 76. If $y_{sk}=0$ μm at x=229.9 mm (end-of-scan sensor 76 location), $x_{int}(T)=229.9$ mm=constant and $y_{sk}=A(T)(x-229.9)$ μm. Print controller 37 uses this information to produce electronic or electromechanical adjustments to correct the individual printhead for this thermally induced skew.

Printhead 12 is designed for minimal bow and includes a setup adjustment at the time of manufacture to further minimize bow. This printhead characteristic is not readily measured in a machine since even the simplest measurement of bow requires three sensors with y direction measurement capability. However, it is possible that only end-of-scan sensor 76 provides measurement in the y direction.

Figure 9:
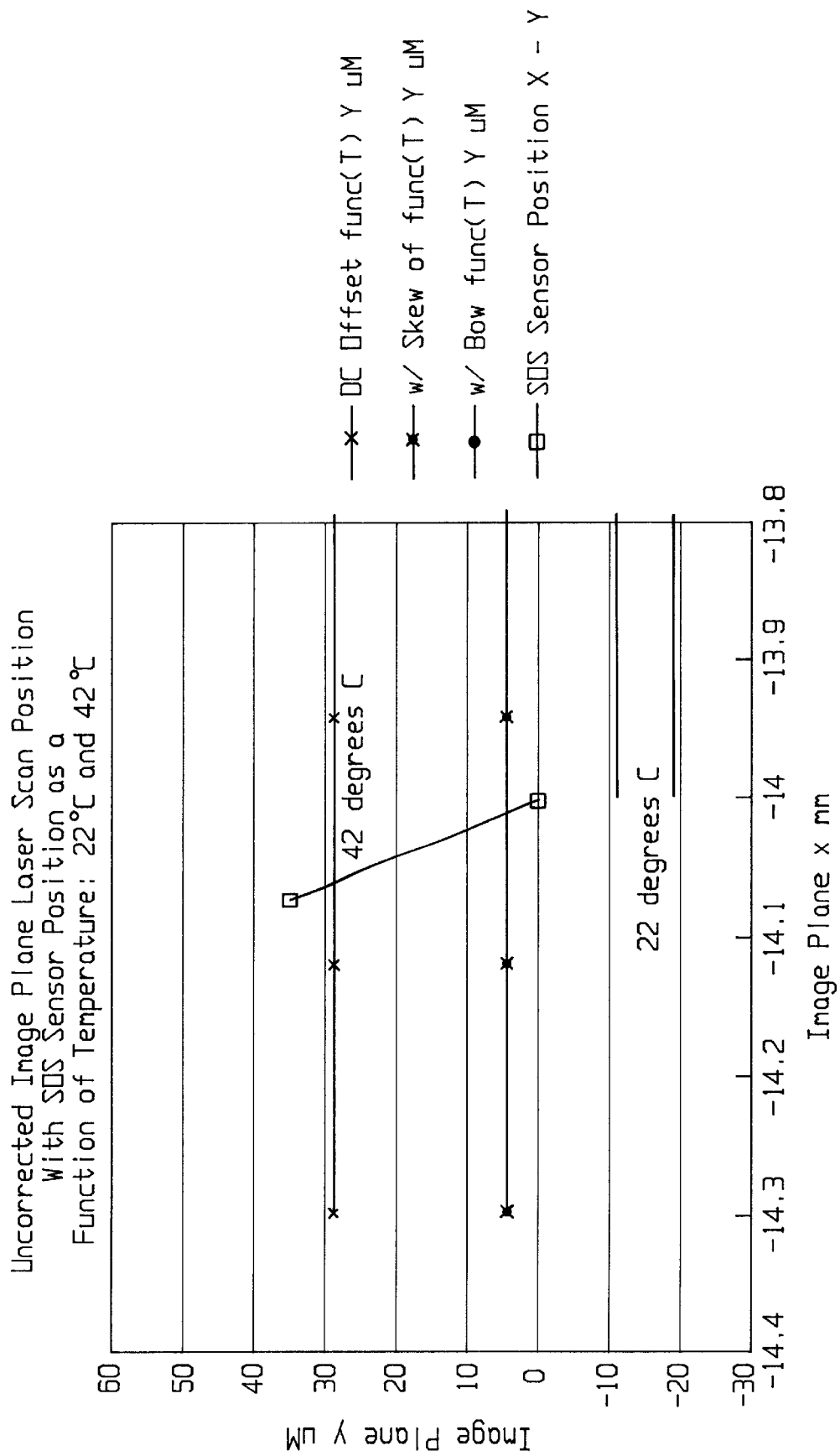
FIG. 9 is a plot of discrete approximations of the four bow characteristics of FIG. 8.
Figure 8:
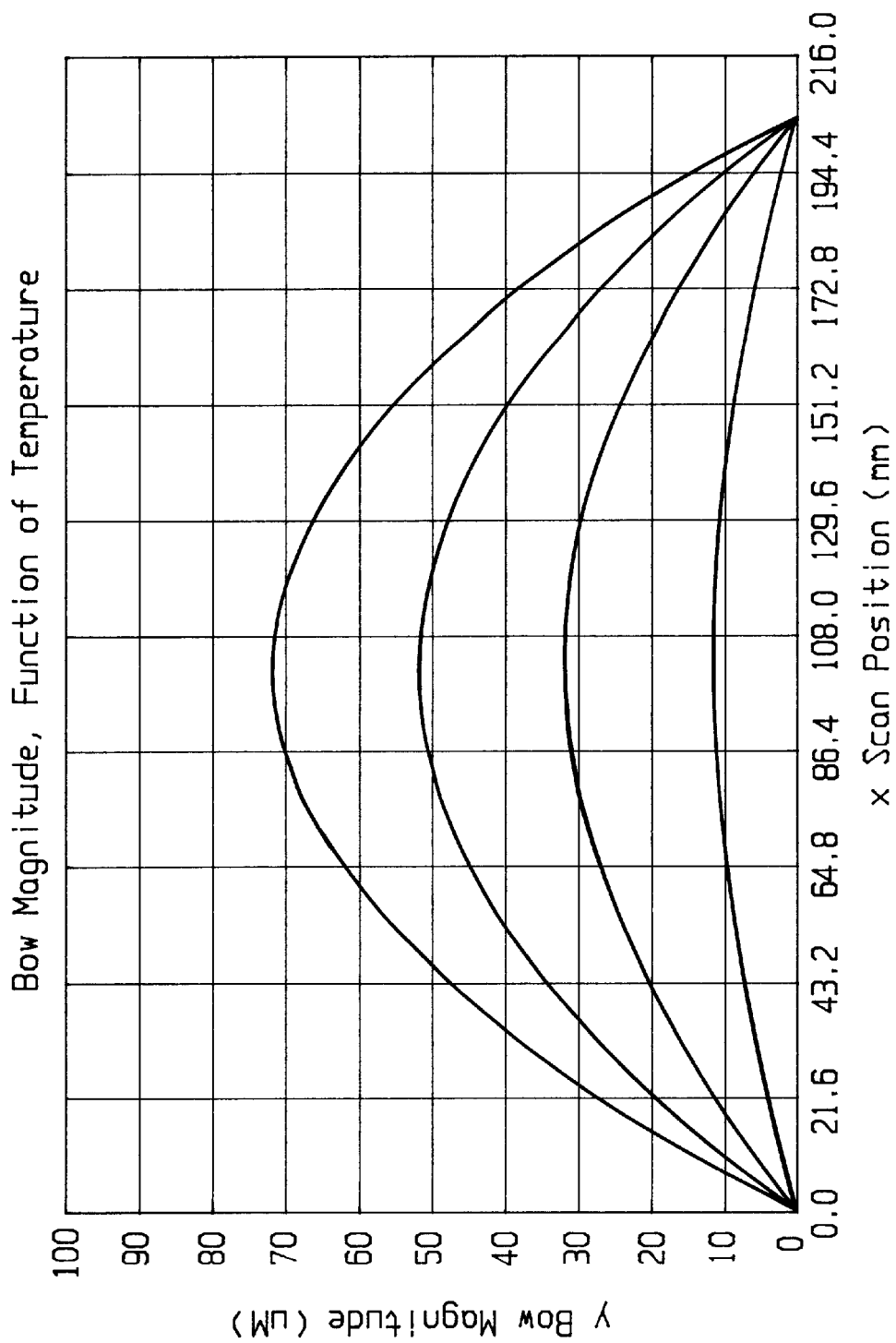
FIG. 8 is an exemplary plot of the bow in the laser scan position of the printhead of FIG. 2 at four different operating temperatures.
Figure 9:
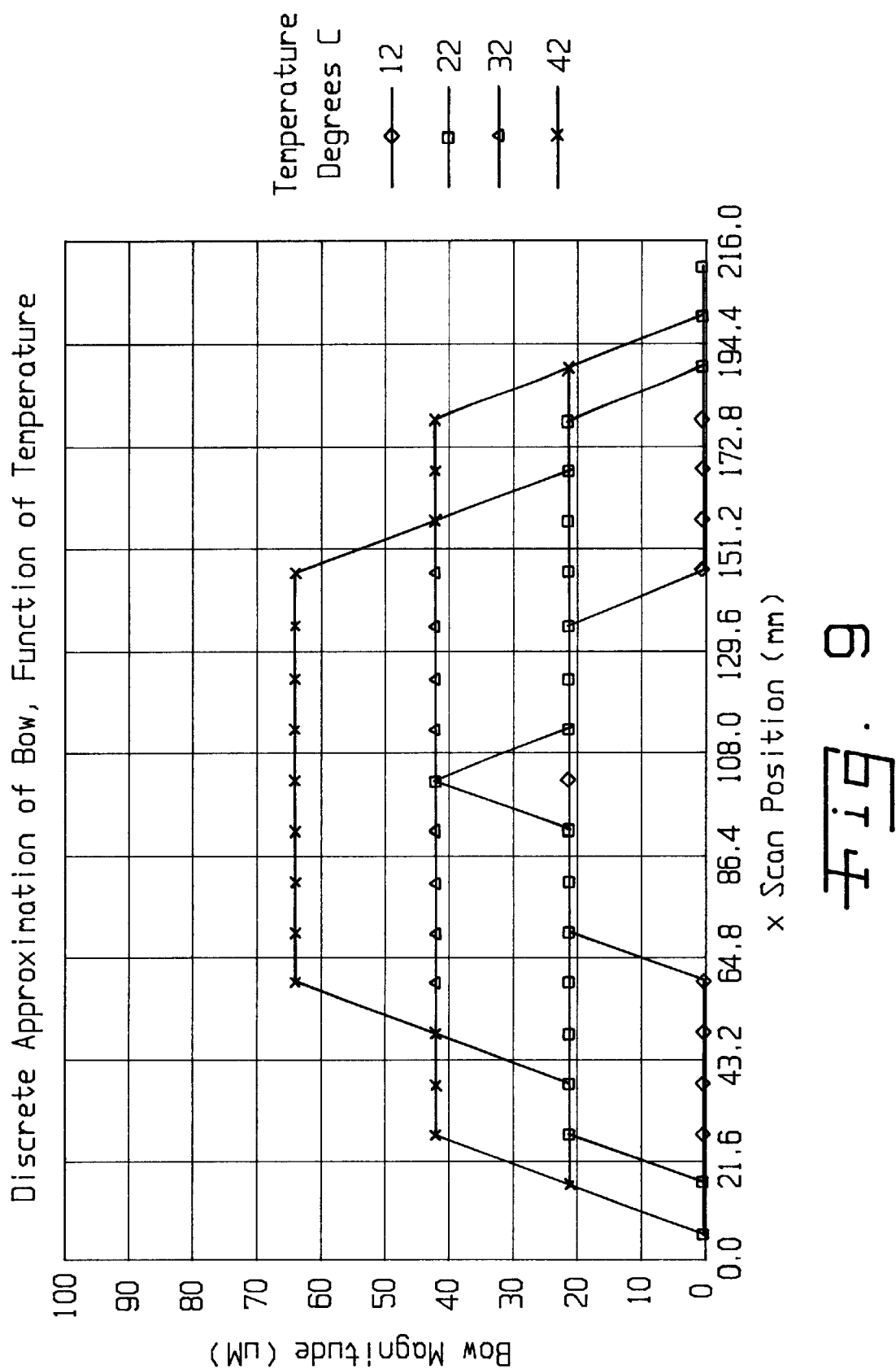
Figure 10:
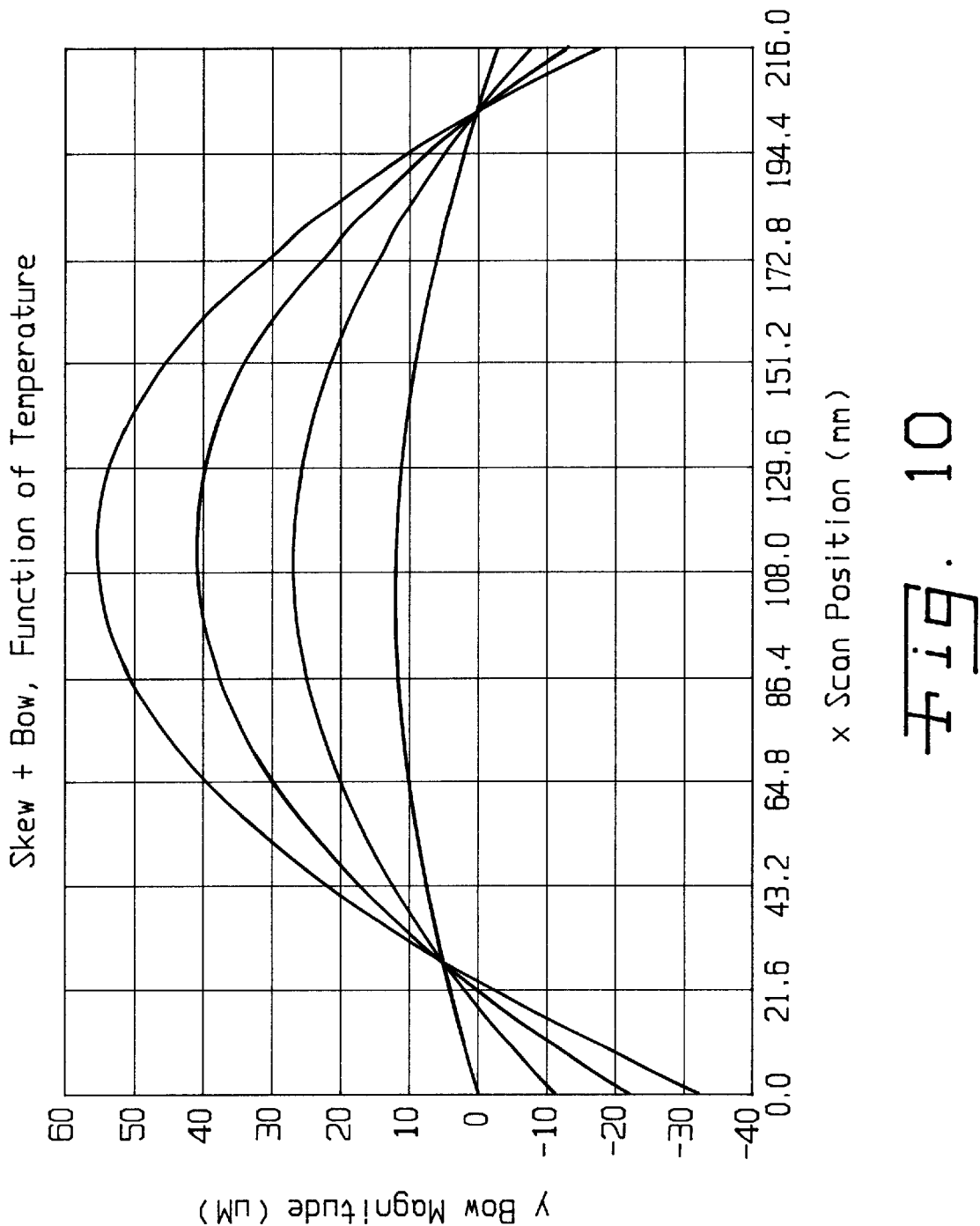
FIG. 10 is an exemplary plot of the bow and skew in the laser scan position of the printhead of FIG. 2 at four different operating temperatures.
Figure 11:
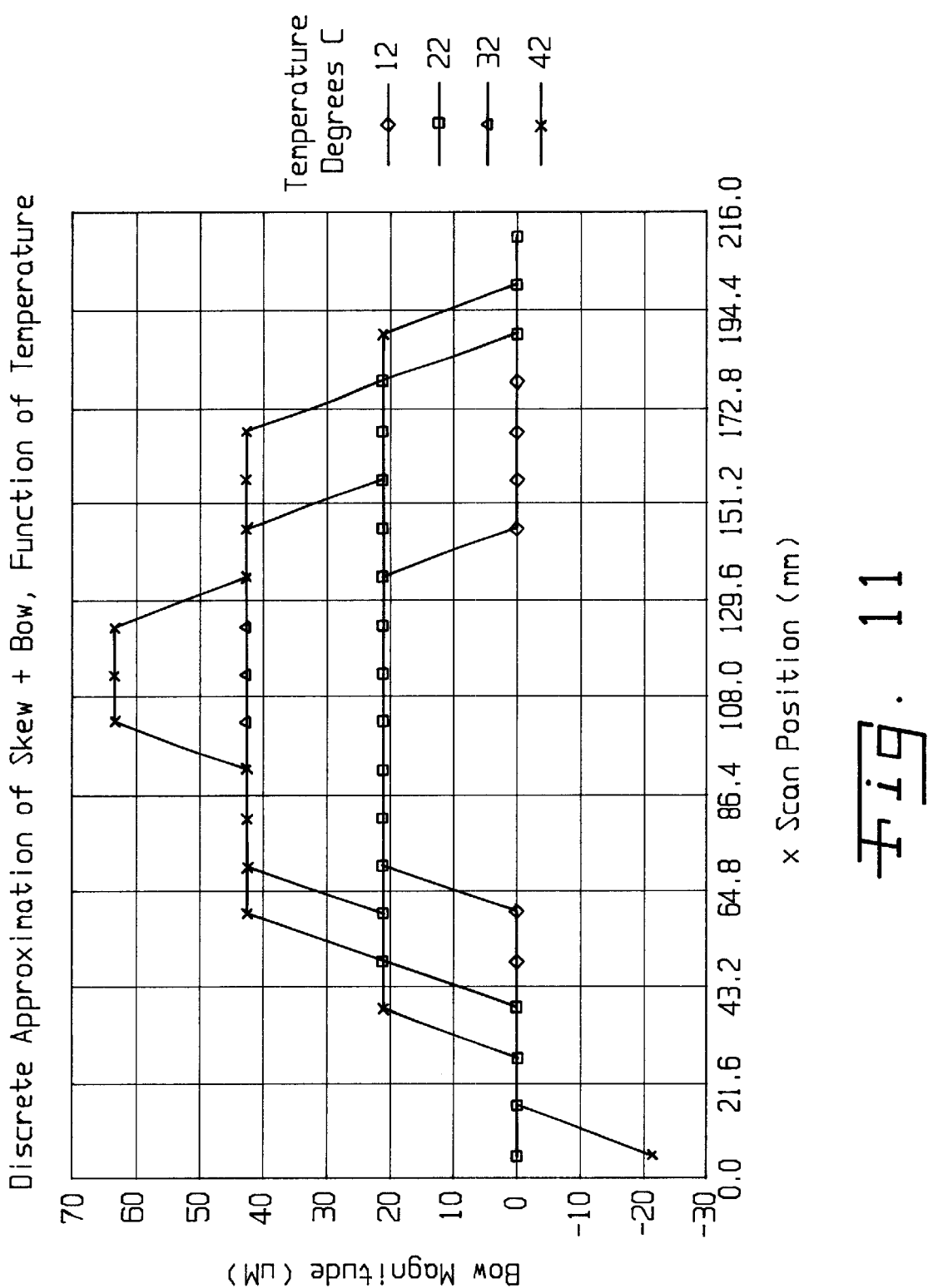
FIG. 11 is a plot of discrete approximations of the four bow and skew characteristics of FIG. 10.

Printhead thermistor sensor 50 can be used to calculate bow based upon a stored model. The bow magnitude is treated as a linear (or other) function of temperature. The shape of the required bow correction is stored as either a polynomial or as a table that is a discrete, step-wise approximation of the y correction required at fixed x locations along the scan. The polynomial or table values are then scaled with temperature and provided as input to print controller 37 to electronically correct the individual printhead for this thermally induced bow. FIG. 8 is a plot of printhead bow versus temperature. FIG. 9 is a twenty-segment plot representing the bow profile. The resulting discrete corrections are rounded to the nearest ½ picture element (pel) increments at a resolution of 600 dots per inch (dpi). Bow magnitude is given by $A_{bow}(T)=2T-12$ μm, where T is in ° C. Image data can be moved (raster-image-processed with hardware assist) in 0, +/−½ pel (600 dpi) increments in y-position at nominally twenty segments along a writing line; and in 0, +/−½ pel (1200 dpi) increments in y-position at nominally forty segments along a writing line.

Microcontroller 37, in order to produce a composite electronic correction, combines bow and skew corrections as a function of temperature and x-scan position. FIG. 9 illustrates an example of composite skew and bow correction. Skew is 1 μm/degree C./215.9 mm with $x_{int}=229.9$ mm and 0 skew at 12° C. Bow is the same as shown in FIG. 8.

Individual printhead sensing and control yields acceptable color registration via correction of cyan, magenta, yellow and black printheads to an absolute datum. However, in another embodiment, it is possible to sense black printhead laser spot position optically and thermally, but to electronically correct only cyan, magenta and yellow printheads relative to black. This has the advantage that black printing is not subject to any artifacts associated with electronic line-length, skew, or bow correction methods.

In this alternative embodiment, all five registration parameters discussed above can be left unchanged for the black printhead as a function of temperature. The three color printheads are corrected based upon the difference between the absolute black position (determined based upon black start-of-scan sensor 88, black end-of-scan sensor 76 and black printhead temperature) and absolute color position (determined based upon individual color start-of-scan sensor 88, color end-of-scan sensor 76 and color printhead temperature). All four printheads are sensed identically and individually with respect to a datum. However, in this alternative embodiment, electronic feedback is to color printheads only, based upon differences between calculated black and color spot positions.

Figure 12:
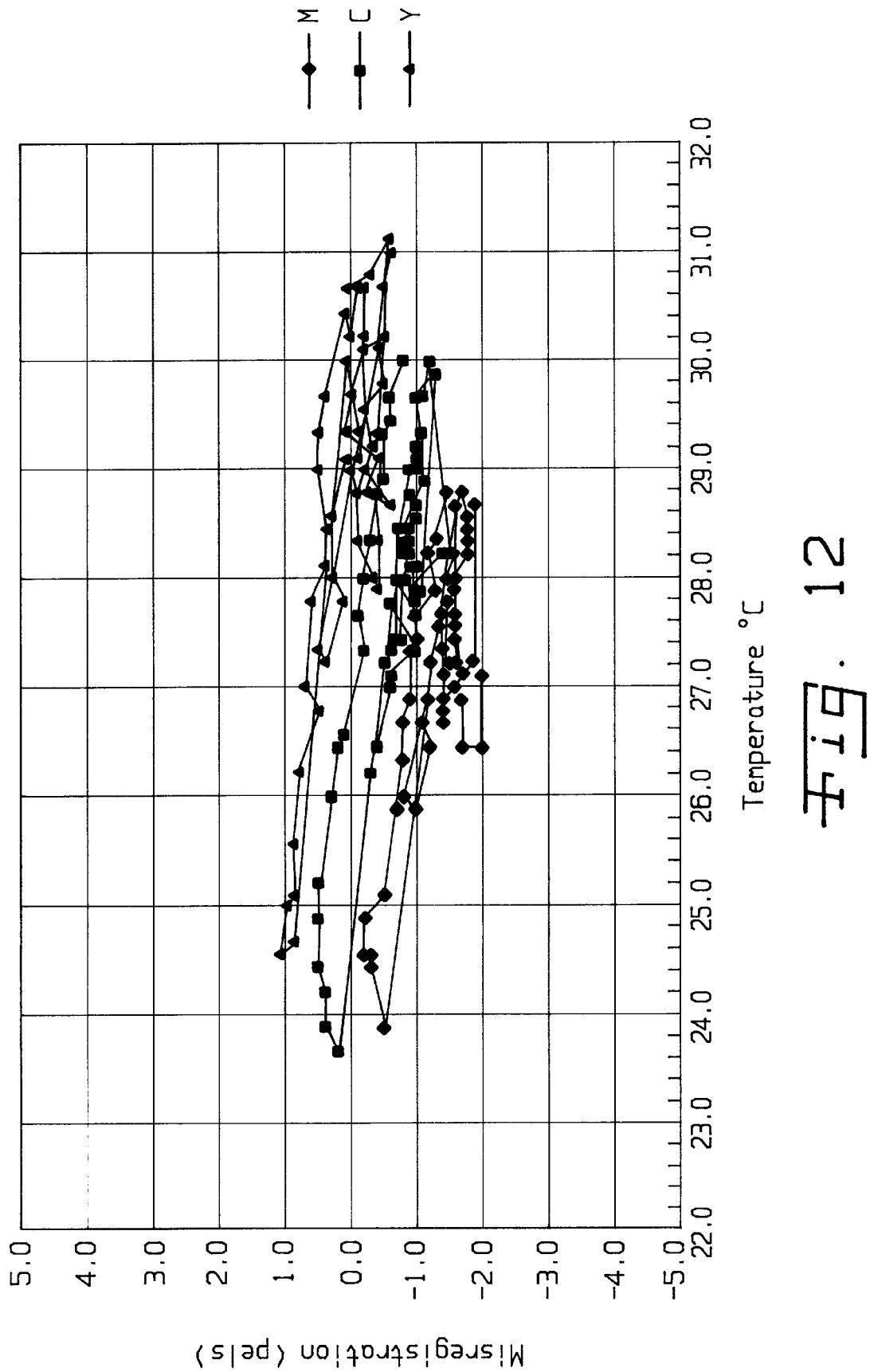
FIG. 12 is a plot of the misregistration in the scan direction of cyan, magenta and yellow versus printhead temperature, without compensation.
Figure 13:
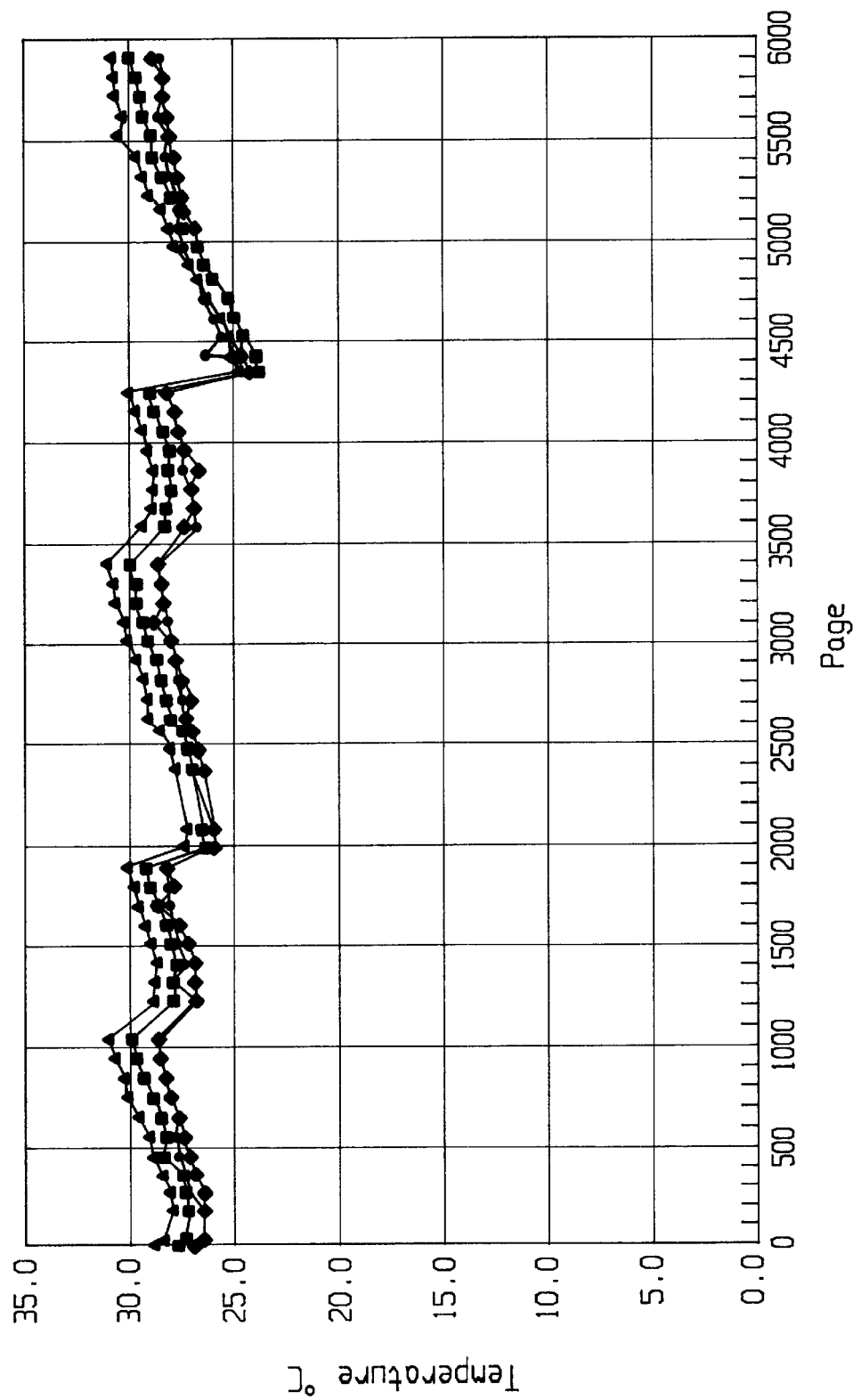
FIG. 13 is a plot of the temperatures of the printheads over the course of a 5000 page run.

Another embodiment addresses the problem of misregistration in scan direction 72 as printhead temperatures vary. FIG. 12 illustrates the misregistration of the magenta, cyan and yellow scan lines in scan direction 72 as referenced to black as a function of printhead temperature. The misregistration is caused by thermal expansion of the optical system, such as the f-theta lens 94, and thermal expansion of printhead bodies or housings 70. FIG. 13 illustrates the variation in temperature of each of printheads 12, 14, 16 and 18 over the course of a 5000 page run. As can be seen, there are substantial differences in temperatures between the printheads over the course of the run. Hence, misregistration in scan direction 72 must be corrected for each of printheads 12, 14, 16 and 18 individually.

Pel (picture element) slices are added or removed from scan lines based on inputs from thermal sensors 50 such that each scan line in each color plane has a desired length over a range of operating temperatures. At factory calibration the length of the black scan line is set by adjusting the rotational velocity of the polygon mirror 80 such that the scan line length is equal to the width of the print medium and is registered therewith. Assuming a page width of 8.5 inches, a print resolution of 600 dots per inch, and 12 slices per pel, there are approximately 61,200 slices per scan line. Pel slices are also added or subtracted from each of the magenta, cyan and yellow scan lines such that each of these scan lines has a length equal to that of the black scan line, i.e., the desired scan line length. Each of the magenta, cyan and yellow scan lines is aligned to black. The number of pel slices per scan line, as well as the printhead temperature at calibration, is stored for each of printheads 12, 14, 16 and 18 in memory 39.

Data relating to the amount of thermal expansion of each of the four scan line lengths as a function of the four printhead temperatures is collected either during calibration or beforehand in the laboratory. The data includes scan line lengths empirically determined at a plurality of measured temperatures of respective printheads 12, 14, 16 and 18 at respective points in time. A percentage change in the scan line length per degree of temperature change, i.e., a coefficient of thermal expansion, is calculated for each of printheads 12, 14, 16 and 18 and stored in memory 39. If the data is collected and the coefficients of thermal expansion are calculated in the laboratory, they can be assumed to apply to all printheads of the same color that are made in production.

When printer 10 is operating in the field, i.e., by a consumer, printhead temperatures are measured by sensors 50 at the start of a print job, and the number of pel slices per scan line is adjusted dependent upon a current printhead temperature, the printhead temperature at calibration, and the stored coefficient of scan line length thermal expansion. The number of pel slices per scan line is adjusted such that the printed scan line length is equal to the desired scan line length determined at calibration.

For example, assume a desired scan line length was achieved by a magenta scan line having 61,200 slices at a calibration temperature of 30° C. Also assume that the coefficient of thermal expansion of the magenta scan line was determined to be 0.010% /° C. If, at the start of a print job, the temperature of the magenta printhead were measured to be 25° C., the number of slices in the magenta scan line would be adjusted to be 61,200*[1+((30° C.–25° C.)*0.00010/° C.)]=61,231 slices. This adjustment in the number of slices per scan line results in the magenta scan line having the same desired length at 25° C. as was achieved by 61,200 slices per scan line at 30° C.

As described above, the processes of empirically determining the calibration scan line lengths, calculating the scan line length coefficients of thermal expansion, and adjusting the number of slices in a scan line are performed separately for each of printheads 12, 14, 16 and 18.

The scan line length has been described herein as changing linearly with temperature. However, it is to be understood that it is possible in the present invention to adjust scan line length using a non-linear model for the thermal expansion of a scan line as a function of printhead temperature. For example, the following equation may be used as a model for the thermal expansion of a scan line length:

$$\text{Thermnal expansion} = (1 + \alpha (\Delta T))/(1 + \beta (\Delta T))$$

wherein alpha is the change in scan line length per ° C. due to the thermal expansion of f-theta lens 94, beta is the change in scan line length per ° C. due to the thermal expansion of printhead housing 70, and $\Delta T$ is the change in temperature.

While this invention has been described as having a preferred design, the present invention can be further modified within the spirit and scope of this disclosure. This application is therefore intended to cover any variations, uses, or adaptions of the invention using its general principles. Further, this application is intended to cover such departures from the present disclosure as come within know or customary practice in the art to which this invention pertains and which falls within the limits of the appended claims.

What is claimed is:

1. A method of printing with an electrophotographic machine, said method comprising the steps of:

providing a scanning laser printhead;

providing a first optical sensor for sensing a start-of-scan position of a laser beam produced by said scanning laser printhead and transmitting a first position signal indicative thereof;

providing a second optical sensor for sensing an end-of-scan position of said laser beam produced by said scanning laser printhead and transmitting a second position signal indicative thereof;

measuring a temperature of said scanning laser printhead with a temperature sensing device;

empirically determining a plurality of positions of each of said first optical sensor and said second optical sensor at each of a plurality of values of said temperature of said scanning laser beam printhead; and adjusting at least one of a modulation and a position of said laser beam produced by said scanning laser printhead based upon said first position signal, said second position signal, said measured temperature of said laser printhead, and said empirically determined positions of said first optical sensor and said second optical sensor.

2. The method of claim 1, wherein said adjusting step includes making electronic adjustments.

3. The method of claim 1, wherein said adjusting step includes making electromechanical adjustments.

4. The method of claim 1, wherein said first optical sensor is mounted in a body of said laser printhead.

5. The method of claim 4, wherein said second optical sensor is rigidly mounted adjacent to an anchor point of said laser printhead.

6. The method of claim 1, wherein said first optical sensor senses said start-of-scan position of said laser beam only along a scan direction of said laser beam.

7. The method of claim 1, wherein said adjusting step compensates for thermally induced errors in at least one of said first position signal and said second position signal.

8. The method of claim 7, wherein said thermally induced errors are caused by a thermally induced change in at least one of said position of said first optical sensor and said position of said second optical sensor.

9. A method of compensating for thermal expansion within an electrophotographic machine, said method comprising the steps of:

providing a scanning laser printhead;

providing at least one optical sensor for sensing at least one scanning position of a laser beam produced by said scanning laser printhead;

generating at least one position signal with said at least one optical sensor, said at least one position signal being indicative of said at least one scanning position of said laser beam;

measuring a temperature of said scanning laser printhead with a temperature sensing device;

empirically determining a plurality of positions of said at least one optical sensor at each of a plurality of values of said temperature of said scanning laser beam printhead; and adjusting at least one of a modulation and a position of said laser beam produced by said scanning laser printhead based upon said at least one position signal, said measured temperature of said laser printhead, and said empirically determined positions of said at least one optical sensor.

10. The method of claim 9, wherein said adjusting step includes controlling at least one of a time at which a scan of said laser printhead starts and a data rate of said scanning laser printhead.

11. A method of printing with an electrophotographic machine, said method comprising the steps of:

providing a scanning laser printhead;

providing at least one optical sensor for sensing at least one of a plurality of scanning positions of a laser beam produced by said scanning laser printhead;

generating at least one position signal with said at least one optical sensor, said at least one position signal being indicative of said at least one scanning position of said laser beam;

measuring a temperature of said scanning laser printhead with a temperature sensing device;

empirically determining a plurality of said scanning positions of said laser beam at each of a plurality of values of said temperature of said scanning laser beam printhead; and adjusting at least one of a modulation and a position of said laser beam produced by said scanning laser printhead based upon said at least one position signal, said measured temperature of said laser printhead, and said empirically determined scanning positions of said laser beam.

12. The method of claim 11, wherein said at least one optical sensor includes at most one optical sensor that can sense one of said scanning positions along a cross-scan direction of said laser beam.

13. The method of claim 12, wherein said adjusting step compensates for thermally induced errors in said scanning positions of said laser beam along said cross-scan direction.

14. The method of claim 13, wherein said adjusting step is performed across substantially an entire scan of said laser beam.

15. The method of claim 13, wherein said adjusting step compensates for at least one of thermally induced skew and thermally induced bow in said scanning positions of said laser beam along said cross-scan direction.

16. An electrophotographic machine, comprising:

a laser device configured for producing a scanning laser beam;

a start-of-scan sensor configured for sensing a start-of-scan position of said laser beam and transmitting a first position signal indicative thereof;

an end-of-scan sensor configured for sensing an end-of-scan position of said laser beam and transmitting a second position signal indicative thereof;

a temperature sensing device configured for measuring a temperature of said laser device;

a memory device for storing a plurality of empirically determined positions of each of said start-of-scan sensor and said end-of-scan sensor at each of a plurality of values of said temperature of said laser device; and a laser controller in communication with each of said laser device, said start-of-scan sensor, said end-of-scan sensor, said temperature sensing device and said memory device, said laser controller being configured for adjusting at least one of a modulation and a position of said laser beam based upon said first position signal, said second position signal, said measured temperature of said laser device, and said empirically determined positions of said start-of-scan sensor and said end-of-scan sensor.

17. The electrophotographic machine of claim 16, wherein said laser controller comprises a means for compensating for thermally induced errors in at least one of said first position signal and said second position signal.

18. The electrophotographic machine of claim 17, wherein said memory device stores a plurality of said scanning positions of said laser beam at each of a plurality of values of said temperature of said scanning laser beam printhead, said laser controller being configured for adjusting said laser beam based upon said empirically determined scanning positions of said laser beam.

19. The electrophotographic machine of claim 16, wherein said laser device comprises a scanning laser printhead.

20. The electrophotographic machine of claim 19, wherein said laser printhead includes a body and an anchor point, said start-of-scan sensor being mounted in said body, said end-of-scan sensor being rigidly mounted adjacent to said anchor point.

21. A method of printing with an electrophotographic machine, said method comprising the steps of:

determining a desired scan line length;

measuring a plurality of temperatures associated with the electrophotographic machine at respective points in time;

empirically determining a plurality of calibration scan line lengths at a plurality of values of said temperatures associated with the electrophotographic machine;

using said calibration scan line lengths to calculate a scan line length thermal expansion as a function of said temperature associated with the electrophotographic machine; and adjusting a number of slices in a scan line to be printed, said adjusting being dependent upon a current one of said measured temperatures and said scan line length thermal expansion such that a length of said scan line to be printed is substantially equal to said desired scan line length.

22. The method of claim 21, wherein said desired scan line length is substantially equal to a width of a print medium to be printed upon.

23. The method of claim 21, comprising the further step of providing a plurality of printheads in the electrophotographic machine, said measuring step comprising measuring a plurality of temperatures associated with respective ones of said printheads at the respective points in time.

24. The method of claim 23, wherein said empirically determining, using and adjusting steps are performed separately for each of said printheads.

25. The method of claim 21, wherein said scan line length thermal expansion comprises a coefficient of thermal expansion.

26. A method of printing with an electrophotographic machine, said method comprising the steps of:

measuring a temperature associated with the electrophotographic machine;

adjusting a length of a scan line dependent upon said temperature; and empirically determining a plurality of scan line lengths at each of a plurality of values of said temperature associated with the electrophotographic machine, said adjusting step being dependent upon said empirically determined scan line lengths.

27. The method of claim 26, comprising the further step of determining a desired scan line length, said adjusting step being performed such that said length of said scan line is substantially equal to said desired scan line length.

* * * * *